United States Patent [19]

Perry

[11] Patent Number: 4,702,514

[45] Date of Patent: Oct. 27, 1987

[54] SLIDING DOOR

[76] Inventor: Arthur H. Perry, 652 School St., Kohler, Wis. 53044

[21] Appl. No.: 852,183

[22] Filed: Apr. 15, 1986

[51] Int. Cl.[4] ...................... E05D 15/10; E05D 15/58
[52] U.S. Cl. ..................................... 296/146; 49/209; 49/212; 49/254
[58] Field of Search .................... 296/155, 146; 49/36, 49/209, 212, 254

[56] References Cited

U.S. PATENT DOCUMENTS

| 2,445,131 | 7/1948 | Wartian | 49/212 X |
| 2,651,541 | 9/1953 | Surles | 296/155 |
| 3,093,405 | 6/1963 | Barenyi | 49/212 |
| 3,169,282 | 2/1965 | Godwin | 49/254 X |
| 3,440,762 | 4/1969 | Olsson | 49/209 |

FOREIGN PATENT DOCUMENTS

| 2119209 | 8/1979 | Fed. Rep. of Germany | 296/146 |
| 0202932 | 11/1984 | Japan | 296/155 |

Primary Examiner—Robert B. Reeves
Assistant Examiner—Russell D. Stormer
Attorney, Agent, or Firm—Richard C. Litman

[57] ABSTRACT

The present invention is directed to a sliding door. The bottom of the door assembly is pivotally mounted to a base. To open the door, the top of the door assembly is pulled away from the opening, to clear the structure. Then the door, which is mounted on vertical guiides, is rolled on these guides to provide an unobstructed opening. The door can be in close quarters, and when open does not interfere with movement into or out of the structure. This invention pertains to doors, windows, hatches, trap doors, skylights or any other temporary closable or openable opening in a structure where it can be utilized.

3 Claims, 6 Drawing Figures

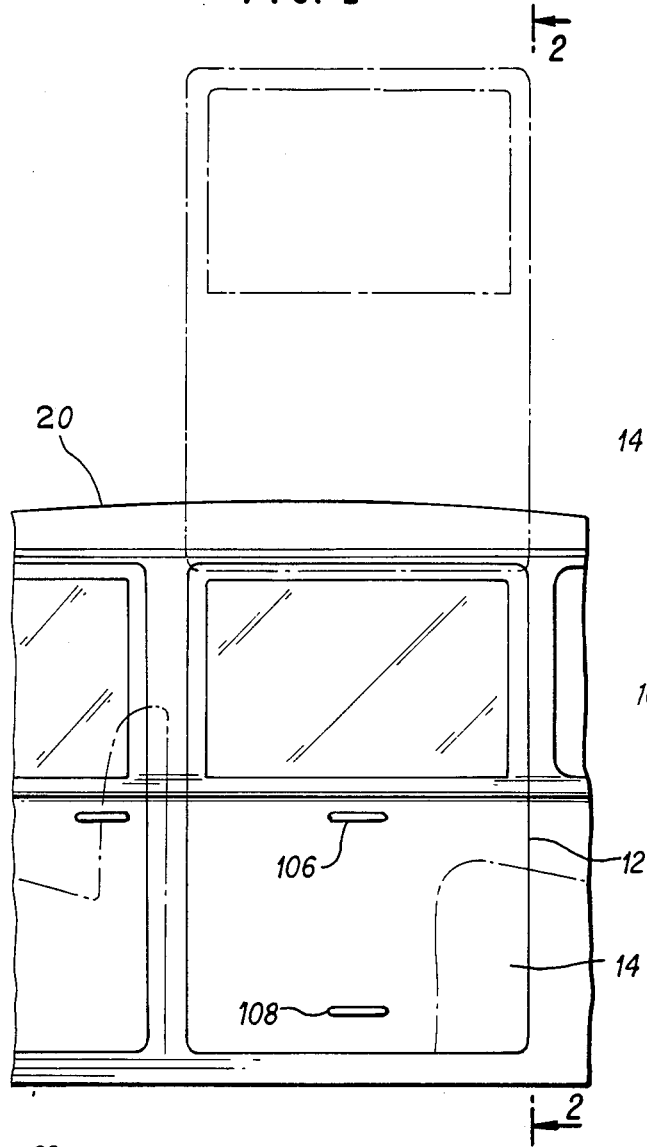
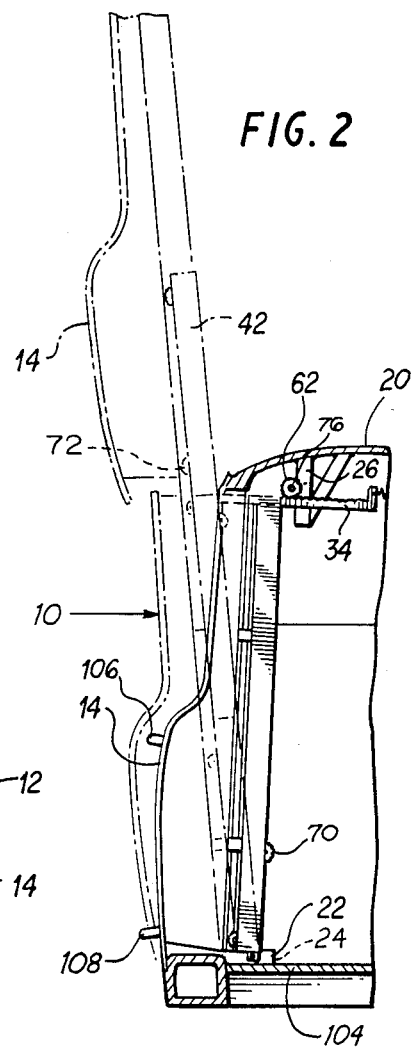
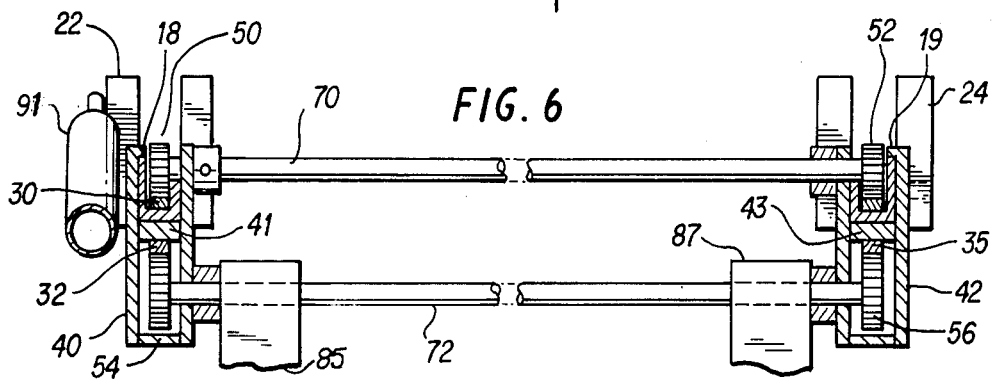

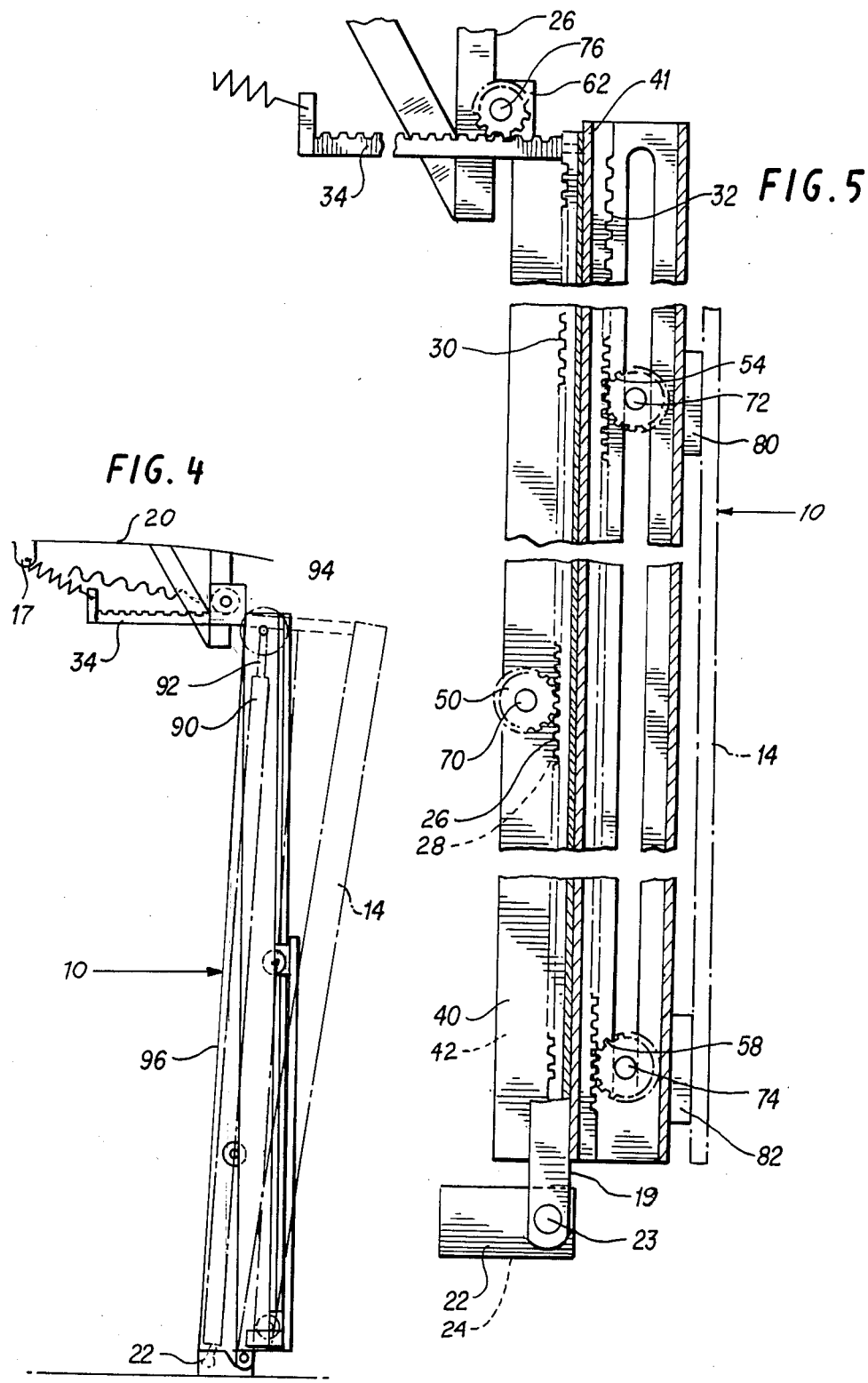

SLIDING DOOR

BACKGROUND OF THE INVENTION

The present invention refers to a door, especially a vehicle door.

Previous designs of such doors have usually been arranged to swing about hinges arranged in the vehicle frame surrounding the door opening. Such doors require a comparatively large space outside of the vehicle to allow the door to open completely. If the door does not open completely, the door interferes with movement into and out of the vehicle. In addition there is also the danger of the door striking an adjacent vehicle or building causing damage to the door and the adjacent vehicle or building.

U.S. Pat. No. 3,440,762 discloses a system employing hydraulics in combination with a dogging mechanism to vertically raise large doors mounted in the shell plating of a ship.

SUMMARY OF THE INVENTION

The present invention is a sliding door assembly for a vehicle which requires little space to be opened, can be opened by hand with no hydraulic or dogging mechanism required, and which leaves an unobstructed opening. The sliding door assembly includes a door frame having two sides which form sides of an opening when the door is opened. A rack is attached to each of the sides and runs on base mounted pinions, one pinion attached to the base opening at each of the horizontal racks. The outward moving racks running on pinions allow movement of the door frame away from the opening. Movement of the frame from the opening is provided by pivotally mounted racks, each rack running in a pinion attached to each side of the frame. Guide means are positioned in each side of the frame for each of the racks. The door frame rides on the first set to partially clear the opening. The door rides with respect to the door frame to clear the opening. This is accomplished by moving the door on the second set of racks mounted in the outside edges of the side of the door frame on mounted pinions. Pinion guides in the sides of the door frame adjacent to the second set of racks guide the door's movement on the door mounted pinions. The sequence in actual operation of the door frame to an intermediate position at the base of the door frame to an intermediate position at the top of the door frame, and thence to an open position with the door frame moving via pinions on the first mentioned racks.

The door mounted pinions preferably include one set of pinion gear bearings rotatably mounted on one end or center of the inside of the door, each bearing positioned on an opposite side of the door, the bearings are carried on a shaft mounted in bearing boxes affixed to the door, a second set of pinion gear bearings are attached to opposite sides of a shaft rotatably mounted in bushing boxes affixed to the other end of the door.

The positions of the various racks and pinions can be reversed, that is to say the racks can be positioned where the pinions are positioned and visa versa. Also the outward moving rack can face toward or away from the opening.

Basically the present invention is directed to a vehicle door, door frame and support assembly having means for moving the door frame out away from the vehicle, a means for raising the frame on the support, and means for raising the door on the door frame to allow entry into the vehicle.

As the racks and pinions utilized in the practice of the present invention are used both as gears and as bearings, the term gears and bearings are used interchangeably, or the parts are simly referred to as racks and pinions without any designation as to whether the parts are functioning as gears or bearings. The primary function of the racks and pinions is to maintain alignment of the door assembly as it opens and closes.

BRIEF DESCRIPTION OF THE DRAWINGS

FIG. 1 shows a door of the present invention in closed position, and in dotted outline in open position.

FIG. 2 is a rear view of the door taken along line 2—2 of FIG. 1 and shows in dotted outline, two of the opening stages.

FIG. 4 shows the initial swinging away of the door from the vehicle.

FIG. 5 is a side view taken along line 5—5 of FIG. 3 showing the rack and pinion arrangements which provide for movement of the door and frame.

FIG. 6 is a top view taken along lines 6—6 of FIG. 3 showing both doors and frame racks and pinions.

DESCRIPTION OF THE PREFERRED EMBODIMENTS

Figure 3:
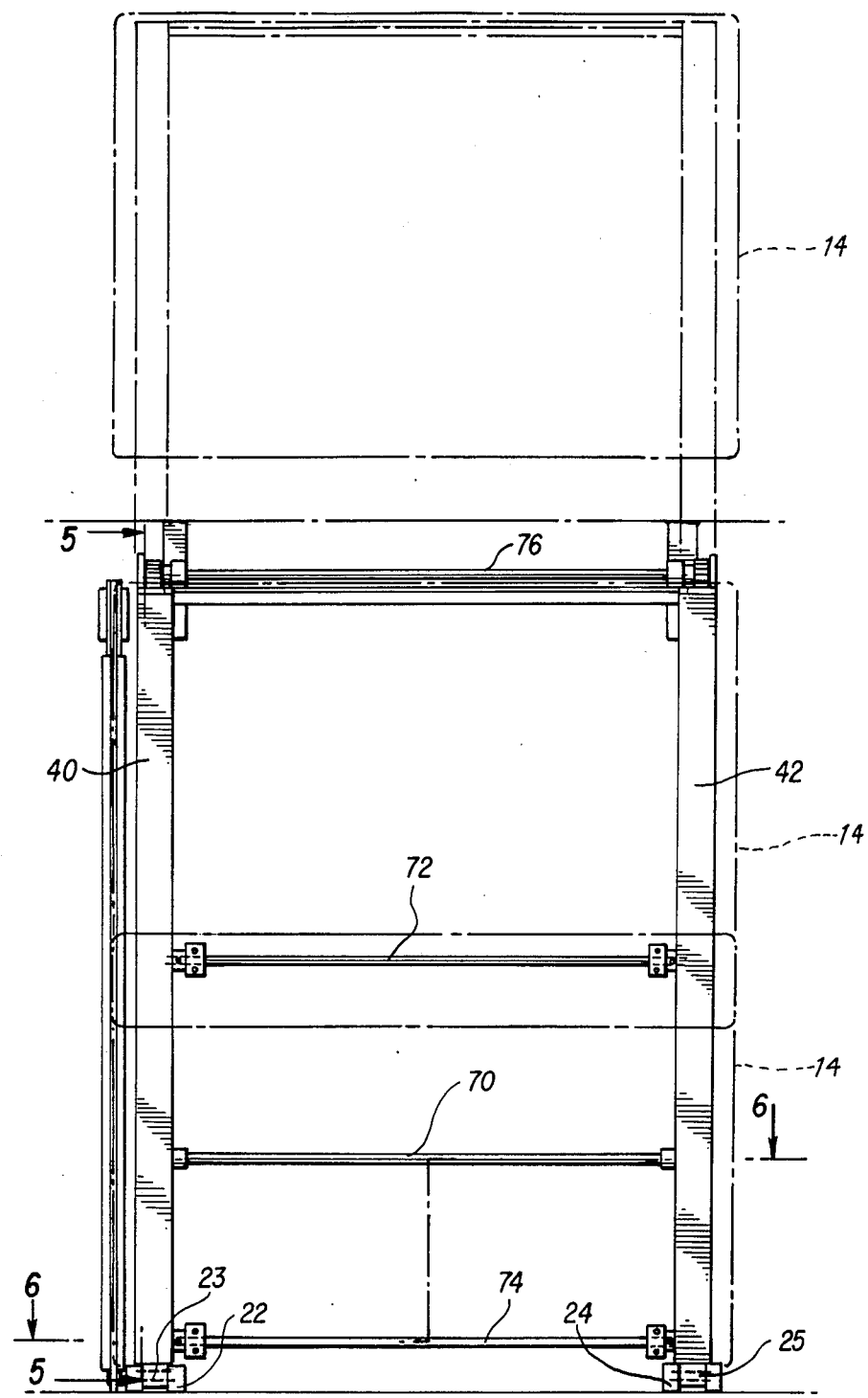
FIG. 3 shows the door frame in lowered position, and in dotted outline in raised position.

Referring now to the drawings there is shown a sliding door mechanism 10 in a door frame 12 having a door 14 for a vehicle 20. The sliding door mechanism 10 is pivotally attached to the vehicle 20 at vehicle mounting brackets 22, 24 (FIGS. 2-6) of mechanism 10 which allows the raising of the door 14 to a position shown above the door opening. The raising of the door frame 12 will now be detailed primarily referring to the mechanism 10 of FIG. 5. As shown in FIG. 1 and FIG. 2 door 14 is pivotally attached to the vehicle 20 at vehicle mounted brackets 22 and 24. The attachment is made through a mechanism which allows the raising of the door 14 to a position above the door opening. This mechanism includes supports 18, 19 for supporting racks 26 and 28 which are pivotally attached by pivots 23, 25 to the brackets 22 and 24 as is shown also in FIG. 3. Racks 26 and 28 engage rotatable pinions 30, 32 and ride on pinions 44 and 46, which pinions are moutned on a shaft 48 which is supported by bearings 50 and 52 which bearings are holes drilled in frame members 40 and 42. The upward movement of frame members 40 and 42 (upwardly) on racks 26 and 28 is kept parallel by this rack and pinion system.

An outside door facing 58 of the door 14 is movable upwardly with respect to the door frame 12 to increase the size of the opening available in the side of the vehicle 20 by the opening of the door 14. There is no bottom and no top cross member to the door frame 12 therefore the space between frame members 40 and 42 becomes usable opening space. The door facing 58 is mounted on upper bushing blocks 60 and 62 and lower bushing blocks 64 and 66. Shaft 68 is rotatably mounted in the upper bushing blocks 60 and 62. Pinions 65 and 66 are affixed to the ends of shaft 74 and ride on racks 70 and 72 which are attached to frame members 40 and 42. An identical mounting arrangement is provided for a lower set of pinions. Shaft 74 is rotatable mounted in bushing blocks 65 and 66. Pinions 76 and 78 are attached to the ends of shaft 74 and ride on racks 70 and 72. Shafts 68 and 74 run in guides 77 and 79, one in each vertical frame members 40 and 42.

Before the door 14 is raised, it is necessary that the top of the door be pulled out and away from the vehicle 20 so that when the door 14 is raised, it will not impact a roof 95 of the vehicle 20. Racks 26 and 28 are hinged on pins 30 and 32 through brackets 22 and 24. Horizontal racks 81 and 83 are attached to the tops of vertical racks 26 and 28. Pulling the door 14 outwardly causes frame members 40 and 42 to pivot on pins 30 and 32 and horizontal racks 81 and 83 to run outwardly on pinions 80 and 82. Slide bearings 85 and 87 guide horizontal racks 81 and 83. Pinions 80 and 82 are mounted on a common shaft 84 supported by frame mounted bushing blocks 86 and 88. On each of the horizontal racks 81 and 83 is a vertical stop 90 and 92, to limit the outward movement of door 10. Springs 93 and 94 anchored to the roof 95 of the vehicle 20 assist the inward closing movement of the door 14 and holds frame members 40 and 42 closed until sufficient outward pressure is exerted to overcome the presence of spring tension.

The upward and downward movement of the door 14 is also biased by air cylinder 91. Air cylinder 91 contains a volume of compressed air which forces shaft 96 in an upward direction. A cable 98 mounted on the vehicle floor 100 runs upward over a pulley 102 attached to the top of shaft 96 and then back down to a bracket 104 attached to the door 14.

Door handles are shown as 106 and 108. Conventional door latching means ar employed and not shown.

I claim:

1. A vertically operable vehicle door assembly for a vehicle
   comprising a frame attached to the vehicle,
   support members pivotally attached to the frame, the support members having a first set of racks to permit the support members to move,
   horizontal rack means attached proximate a top of the support members and the vehicle for moving the support members out and away from the vehicle,
   a box frame enclosing the suport members,
   pinions mounted in the box frame for engaging with the first set of racks to permit vertical movement of the box frame along the support members,
   a second set of racks in the box frame to allow further upward movement of the box frame,
   a door, and
   pinions attached to the door to engage the second set of racks to permit vertical movement of the door with respect to the box frame.

2. The apparatus of claim 1 wherein the horizontal rack means is positioned at an upper portion of the support members and of the vehicle.

3. The apparatus of claim 1 wherein are included guide means in the side of the frame adjacent the second set of racks to guide the movement of the door from a closed downward position at a lower part of the box frame to an intermediate position at the top of the frame on the first set of racks, and thence to an open position with the box frame moving upwardly on the first set of racks.

* * * * *